Figure 1:
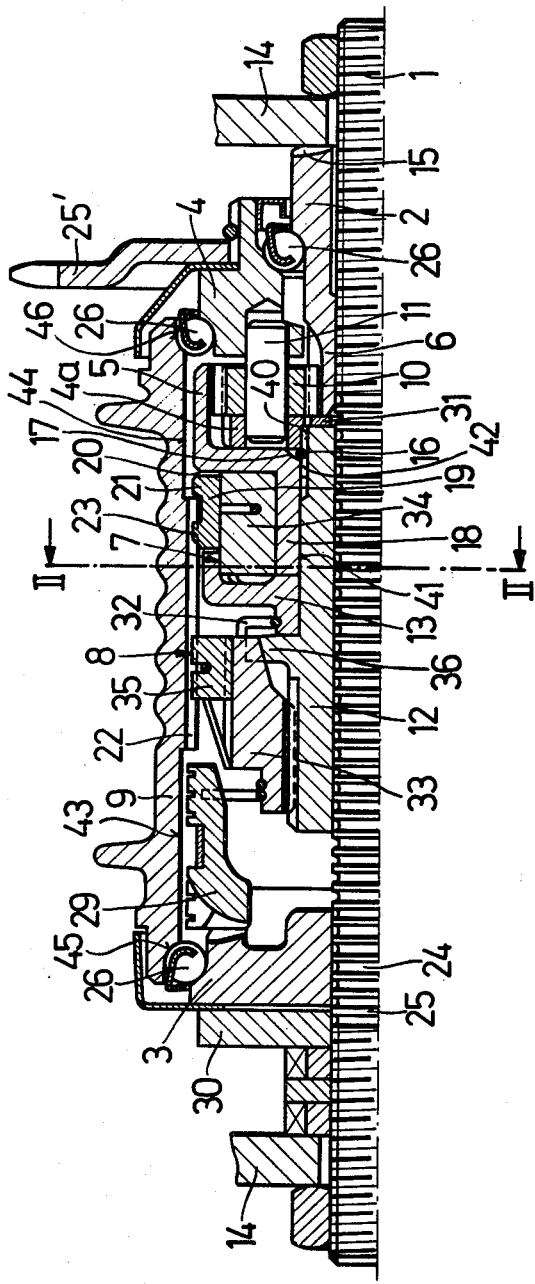

United States Patent [19]

Schulz

[11] 3,878,737
[45] Apr. 22, 1975

[54] TWO-SPEED HUB FOR BICYCLES WITH BACK-PEDALLING BRAKE

[75] Inventor: Horst Schulz, Schweinfurt/Main, Germany

[73] Assignee: Fichtel & Sachs AG, Schweinfurt/Main, Germany

[22] Filed: July 2, 1973

[21] Appl. No.: 375,783

[30] Foreign Application Priority Data
July 4, 1972 Germany............................ 2232741

[52] U.S. Cl. ................................ 74/750B; 192/6 A
[51] Int. Cl. .............................................. F16h 3/44
[58] Field of Search ....... 192/6 A; 74/750 B, 752 R, 74/768, 769

[56] References Cited
UNITED STATES PATENTS

| | | | |
|---|---|---|---|
| 3,147,641 | 9/1964 | Schwerdhofer | 74/750 B |
| 3,180,181 | 4/1965 | Schwerdhofer | 174/750 B |
| 3,200,669 | 8/1965 | Schwerdhofer | 192/6 A X |
| 3,211,023 | 10/1965 | Schwerdhofer | 74/750 B |
| 3,215,002 | 11/1965 | Schwerdhofer | 192/6 A X |
| 3,270,589 | 9/1966 | Schwerdhofer | 74/750 B |
| 3,299,745 | 1/1967 | Toplis | 74/750 B |
| 3,351,165 | 11/1967 | Shimano | 192/6 A |
| 3,592,081 | 7/1971 | Schwerdhofer | 74/750 B |
| 3,648,809 | 3/1972 | Schwerdhofer | 192/6 A |

FOREIGN PATENTS OR APPLICATIONS

| | | | |
|---|---|---|---|
| 1,313,441 | 1/1962 | France | 74/750 B |

*Primary Examiner*—Samuel Scott
*Assistant Examiner*—Lance W. Chandler
*Attorney, Agent, or Firm*—Hans Berman

[57] ABSTRACT

A two-speed bicycle hub with back-pedalling brake has a driver member, also serving as a planet carrier, rotatably mounted on a first bearing member fixed on one axial end of the stationary hub shaft, and a hub sleeve rotatably mounted on the driver member and on a second bearing member on the other axial end of the shaft. A driven sleeve member freely rotatable on the shaft is coupled to the planet carrier and rotatably carries a ring gear meshingly engaged by planet gears on the planet carrier which also mesh with a sun gear on the first bearing member. A brake cone threadedly mounted on the sleeve member spreads a braking shell into engagement with the hub sleeve when the driver member is turned backward. Pawls on the brake cone had a reduced neck portion of the ring gear drive the hub sleeve at the higher speed of the ring gear, or at the speed of the driver member when the pawls on the ring gear are disengaged. The ring gear and the driven sleeve member are axially secured in the direction by abutting engagement with the planet carrier and the first bearing member respectively. In the other axial direction, the ring gear is secured by an abutment on the hub sleeve, and the driven sleeve member by abutting cooperation with the ring gear.

11 Claims, 4 Drawing Figures

TWO-SPEED HUB FOR BICYCLES WITH BACK-PEDALLING BRAKE

This invention relates to a multiple-speed hub for bicycles, comprising a hub shaft two; bearing cones on said hub shaft; a driver member on a first one of said bearing cones; a hub sleeve supported at one axial end on said driver member and on the other hand on the second beraing cone; a planetary gear means housed within said hub sleeve with a sun gear; a planet carrier driven by said driver member; planet gears on said planet carrier; and a ring gear; further comprising a driven sleeve member connected in torque-transmitting relation to said planet carrier by releasable connecting means, said driven sleeve member being supported on said hub shaft at that side of the planet carrier which is remote from said driver member, and having, adjacent said planetary gear means, a bearing section for rotatably mounting of a reduced bearing neck of said ring gear; and further comprising — also within said hub sleeve — a first coupling means driven by said ring gear and a second coupling means driven by said driven sleeve member, and shifting means to selectively bring into operation the one or the other of said driven coupling means.

In known hubs of that type, the elements of the planetary gear means and the driven sleeve member are secured against axial movement away from the driver member by stop means which are mounted on the hub shaft. This makes the manufacture of the hub shaft complicated and expensive.

From U.S. Pat. No. 3,351,165 have already become known multi-speed hubs wherein hub shafts of simple construction are used. These multi-speed hubs do, however, not provide the features of the above-defined hubs, and their hub sleeves are very complicated in their construction.

It is an object of this invention to arrange the elements of the multi-speed hub, as defined above, in such a way that a simplied form of a hub shaft can be used.

The improvement provided by this invention consists in the features that the ring gear is secured to the inner wall of said hub sleeve against axial movement away from said driver member, and that said driven sleeve member is secured to said ring gear against axial movement away from said driver member.

Figure 3:
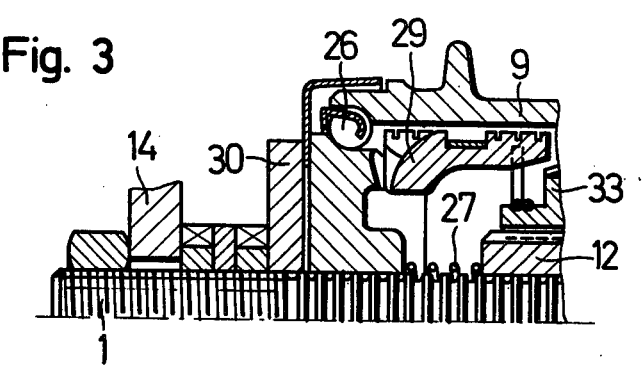

Other features, additional objects, and many of the attendant advantages of this invention will readily become apparent from the following detailed description of preferred embodiments of the invention when considered in connection with the appended drawing in which:

FIG. 1 shows half the longitudinal section through a multi-speed hub according to this invention with the driven sleeve member axially fixed to the ring gear;

Flg. 2 is a cross-sectional view II—II through FIG. 1;

FIG. 3 shows a partly longitudinal section through a hub with the driven sleeve member axially fixed to the ring gear by a compression spring;

Flg. 4 shows a partly longitudinal section through a hub with the driven sleeve member axially fixed to the ring gear by a spacing sleeve.

Referring now to FIG. 1, the hub shaft according to this invention is designated by reference numberal 1. At the driving side the first bearing cone 2 is mounted to the hub shaft and screwed onto a threaded, axially terminal portion thereof. The first rib 25 of a series of uniformly spaced, alternating grooves 24 and ribs 25 on the hub shaft serves as stop means. The grooves and ribs are annular, and the peripheral areas of the ribs 25 serve as contact surfaces for the driven sleeve member 12 and as bearing face for the second bearing cone 3 respectively. The second bearing cone 3 is seated on that end of the hub shaft 1 which is axially remote the driving side, i.e., seated — as already mentioned — in the area of the series of grooves and ribs. If the hub has a back-pedalling brake as in this embodiment, the braking moment transmitted from the braking shell 29 to the second bearing cone 3 is transmitted to the bicycle frame 14 by a lever 30 supported on the frame. In addition, said second bearing cone 3 serves for one axially terminal portion of the hub sleeve 9; in an embodiment without a back-pedalling brake this is the main function of said second bearing cone. The hub sleeve 9 is supported by a ball bearing 26. The other axially terminal portion of the hub sleeve 9 is supported by a ball beraing 26 on the driver member 4 which in turn, is supported, by a further ball bearing 26, on said first bearing cone. Besides the elements which are primarily necessary for the bearing, i.e., hub shaft 1, first and second bearing cones 2, 3, driver member 4, hub sleeve 9 and the associated bearings 26, the hub comprises further assembly groups which are a planetary gearing, shifting means with the associated coupling elements, and transmission elements.

The planetary gearing comprises a planet carrier 4, 4a, which simultaneously serves as the driver member and carries the driving chain wheel 25'; further, the gearing comprises a ring gear 5 and a sun gear 6. The planet carrier 4, 4a accommodates the planet gear shafts 11 on which the planet gears 10 are mounted for rotation in simultaneous meshing engagement with the sun and ring gears. The inner portion of the planet carrier 4, 4a is seated on the driven sleeve member 12 and non-rotatably connected wih the latter. The ring gear 5 has a radially reduced neck 18 on which the first freewheel coupling 7 is arranged. In the embodiment of this invention this is effected by rotatably mounting the pawls of this freewheel coupling directly on neck 18 without the interposition of further elements. The sun gear 6 is manufactured in one piece with the first bearing cone 2 and is provided at the inner end of the latter. The inner end of the sun gear serves further as abutment for the driven sleeve member 12 either directly or by the interposition of a supporting ring 31.

In the illustrated embodiment the shifting means consist of a shifting ring 13 which is rotatably mounted on said driven sleeve member 12 and which engages said first freewheel coupling 7 by means of a projectng collar. This shifting ring is connected by a friction spring 32 during back-pedalling, with a braking cone 33 which in turn is connected to the braking shell 29 by a friction element. As can be seen from FIG. 2 the collar of, the shifting ring 13 is provided at its inner face embracing the freewheel coupling 7 with curved faces for the pawl control.

The coupling elements for the gear shift of the multi-speed hub consist of a first freewheel coupling 7 and of a second freewheel coupling 8. The freewheel coupling 7 comprises one or several pawls 34 which are pivoted directly to the neck 18 of the ring gear. The pawls are biased, as usually, by an open annular spring extending along a groove. The outer ends of the pawls engage with an engaging ring 19 which is non-rotatably connected with axially elongated ribs 22 of the hub sleeve by projections 23 received in recesses bounded by the ribs 22. The axial fixing is effected by the annular projection 21 whose uninterrupted front face abuts against the transverse end faces of the ribs 22. This prevents a displacement of gear elements and of the driven sleeve member 12 toward the bearing cone 3, because the ring gear 5 has in this direction a lateral abutment face 20 for the engaging ring 19.

The coupling elements further comprise the second freewheel coupling 8 which comprises pawls 35 on the braking cone 33. The pawls 35 engage the ratchet formed by the ribs 22 of the hub sleeve. The most important part of the transmission elements is the driven sleeve member 12 which for axial support of the gear elements and of the shifting means comprises a stop means 36 whose other side serves as an axial abutment for the braking cone 33.

As can be seen from the structure of the hub, the hub shaft 1 does not have even one longitudinal dimension that needs to be maintained to an exacting tolerance; this allows inexpensive production on a large scale. The position of the other hub parts with respect to the hub shaft is only defined by the distance of the ball race on the first bearing cone 2 from the front face of the sun gear 6. The bearing face of the hub shaft 1 which is formed by the peripheral faces of the ribs 25, is not hardened and is made, such as the screw sections, by rolling a cylindrical rod having constant diameter throughout its full length. The size of this bearing face corresponds approximately to that of the external thread diameter. In combination with the axial securing of the driven sleeve member 12 to the ring gear by an annular spring 16 as will be described hereinafter and the fixing of the engaging ring 19 to the hub sleeve and thus relative to the second bearing cone 3 by the hub sleeve, this construction allows, besides generous tolerances for the hub shaft 1 also generous tolerances for the longitudinal dimensions of the other structural elements; this allows a considerably simplified and cheap production.

The function of the hub has already become known from prior publications. The hub described in this application is a two-speed hub with a back-pedalling gear shift for high speed and direct torque transmission.

High-speed operation takes place when the first freewheel coupling 7 is in operation. In this shifting position the pawls 34 of th first freewheel coupling 7 are in engagement with the engaging ring 19 which is provided at its inner peripheral face with rachet teeth. The flow of the driving torque is as follows: the motion is transmitted from the driving chain wheel 25 via planet carrier 4, 4a, the planetary gears and the gear ring 5 to the pawls 34 and from there via the engaging ring 19 and the projections 23 to the ribs 22 of the hub sleeve 9. In this mode of operation, the pawls 35 of the second freewheel coupling 8, which are also in engagement with the ribs 22, are overrun by the hub sleeve 9.

The direct torque transmission is as follows: the pawls 34 are pivoted inwardly by relative angular movement of the ring gear 5 and the shifting ring 13, and withdrawn from the engaging ring 19. In this shift position, the torque of the driving chain wheel is transmitted via the planet carrier 4, 4a and the driven sleeve member 12 directly to the braking cone 33 and thus to the pawls 35.

The reaction moment of the sun gear 6 is transmitted directly to the bicycle frame 14 by the first bearing cone 2 and its indentation 15, so that the normally existing indented discs on the hub shaft for receiving the reaction moment from the hub shaft via flattened portions can be dropped. By the omission of the indented discs the necessary length of the shaft is once more reduced, which means another reduction of the necessary material.

Figure 2:
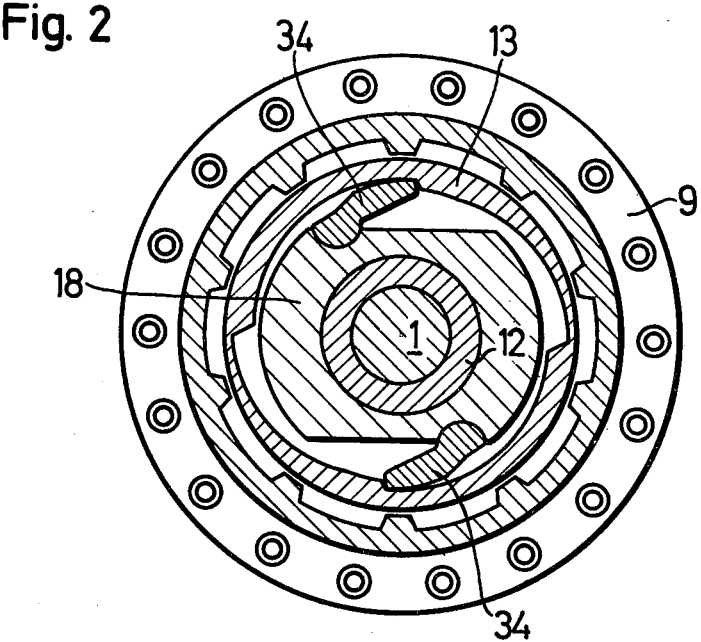

FIG. 3 shows another embodiment of the invention concerning the support of the driven sleeve member 12. Since the construction of the hub is otherwise the same as shown in FIGS. 1 and 2, FIG. 3 illustrates only the left end portion of the hub.

From this figure can be seen the arrangement of the compression spring 27 between an axial end portion of the driven sleeve member 12 and the inner front portion of the second bearing cone. In a preferred embodiment the hub shaft 1 has a guiding function for said compression spring 27. In this embodiment the axial support of the engaging ring 19 (see FIG. 1) in the hub sleeve 9 by the ribs 22 could possibly be omitted. The use of the compression spring 27 as abutment element allows substantially play-free abutment of the associated parts even without exact manufacturing tolerances.

Figure 4:
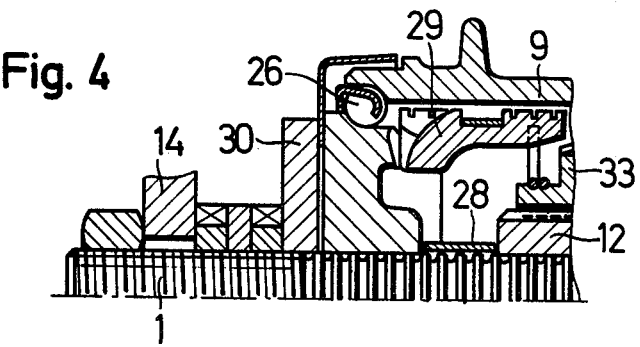

FIG. 4 shows another, very similar embodiment; in this figure the compression spring 27 is replaced by a spacing sleeve 28.

With respect to the embodiment of FIG. 1 the following is to be added: On the driven sleeve member 12 is provided a bearing face 41 on which the bearing neck 18 of the ring gear 5 is rotatably mounted.

The driven sleeve member 12 is releasably connected to the planet carrier 4, 4a by a connecting means 40 which is formed by outer teeth on the driven sleeve member 12 and inner teeth of the planet carrier 4, 4a.

The annular spring 16 is inserted in an annular groove 42 which is cut into the outer teeth of the driven sleeve member 12. The spring 16 is received in the groove 42, partly projects from the groove in a radially outward direction, and axially abuts against a face 17 of the neck 18.

The hub sleeve 9 is — adjacent the inner ribs 22 — provided with two smooth cylindrical sections 43, 44; the ribs 22 project radially inwardly over these smooth cylindrical sections.

Adjacent the smooth cylindrical sections 43, 44 there are provided bearing faces 45, 46 for the ball bearings 26.

The stop means 36 are not to be regarded as a circular collar but as two diametrically opposed cams projecting from the driven sleeve member; these cams serve on the one hand as abutments for the axial fixing of the shifting ring 13 and on the other hand for restricting the helicoidal movement of the braking cone 33 on the driven sleeve member 12.

With respect to the embodiments of FIGS. 3 and 4 is to be added that on account of the presence of the compression spring 27 or the spacing sleeve 28 respectively, both the annular spring 16 as well as the annular projection 21 become surperfluous.

The embodiment of FIG. 1 is preferred to the embodiments of FIGS. 3 and 4, because thanks to the presence of the annular spring 16 the driven sleeve member 12, shifting ring 13, friction spring 32, pawls 34, engaging ring 19 and ring gear 5 may be preassembled and the whole assembly may then be inserted together with the hub shaft 1 into the hub sleeve 9.

What is claimed is:

1. A multiple-speed hub for a bicycle comprising:
   a. a hub shaft having an axis,
      1. an axial portion of said shaft carrying a plurality of axially uniformly spaced, annular ribs defining therebetween annular grooves, each rib having an outer face;
   b. first and second bearing members mounted on said shaft in axially spaced relationship;
   c. a driver member mounted on said first bearing member for rotation about said axis;
   d. a hub sleeve having two axially terminal portions mounted on said driver member and on said second bearing member respectively for rotation about said axis;
   e. planetary gearing in said hub sleeve including
      1. a planet carrier connected to said driver member for joint rotation,
      2. a ring gear rotatable about said axis,
      3. a sun gear secured against rotation about said axis, and
      4. a planet gear rotatable on said planet carrier in simultaneous meshing emgagement with said ring gear and said sun gear;
   f. a sleeve member movably mounted on said shaft and connected to said planet carrier for joint rotation,
      1. said outer faces rotatably engaging said sleeve member,
      2. said sleeve member having an outer bearing face offset axially from said planet gear toward said second bearing member, and
      3. said ring gear having a neck portion rotatably engaging said bearing face;
   g. first and second coupling means drivingly connected to said ring gear and to said sleeve member respectively for joint rotation and engageable with said hub sleeve;
   h. shifting means for selectively actuating one of said coupling means;
   i. cooperating first abutment means on said hub sleeve and on said ring gear securing said ring gear against axial movement toward said second bearing member; and
   j. cooperating second abutment means on said ring gear and on said sleeve member securing said sleeve member against axial movement toward said second bearing member.

2. A hub as set forth in claim 1, wherein said second abutment means include an annular member seated on an outer face of said sleeve member and axially abutting against said neck portion.

3. A hub as set forth in claim 2, wherein said outer face is formed with an annular groove axially adjacent said planet carrier, and said annular member is received in said groove and radially projects from said groove.

4. A hub as set forth in claim 1, wherein said first abutment means include an engaging ring fixedly fastened to said hub sleeve and abuttingly engaging said ring gear.

5. A hub as set forth in claim 4, wherein said first coupling means include a coupling member on said neck portion engaging said ring when said first coupling means is actuated.

6. A hub as set forth in claim 4, wherein said first abutment means further include a plurality of axially elongated, circumferentially spaced ribs on said hub sleeve, said ribs circumferentially bounding recesses therebetween, said engaging ring carrying a radial projection received in one of said recesses and an annular projection, one of said ribs having a transverse end face axially directed toward said first bearing member and abuttingly engaging said annular projection.

7. A hub as set forth in claim 1, wherein said first coupling means include a pawl member on said ring gear and ratchet means on said hub sleeve, said shifting means including a shifting member rotatably mounted on said sleeve member, means for angularly moving said shifting member relative to said ring gear, engaging means on said shifting member engaging said pawl member and withdrawing the same from said ratchet means in response to said angular moving, and stop means on said sleeve member axially securing said shifting member against axial movement toward said second bearing member.

8. A hub as set forth in claim 1, wherein an axially terminal portion of said shaft contiguously adjacent said rib-carrying portion is threaded, said first bearing member threadedly engaging said terminal portion.

9. A multiple-speed hub for a bicycle comprising:
   a. a hub shaft having an axis,
      1. an axial portion of said shaft carrying a plurality of axially uniformly spaced, annular ribs defining therebetween annular grooves, each rib having an outer face;
   b. first and second bearing members mounted on said shaft in axially spaced relationship;
   c. a driver member mounted on said first bearing member for rotation about said axis;
   d. a hub sleeve having two axially terminal portions mounted on said driver member and on said second bearing member respectively for rotation about said axis;
   e. planetary gearing in said hub sleeve including
      1. a planet carrier connected to said driver member for joint rotation,
      2. a ring gear rotatable about said axis,
      3. a sun gear secured against rotation about said axis, and
      4. a planet gear rotatable on said planet carrier in simultaneous meshing engagement with said ring gear and said sun gear;
   f. a sleeve member movably mounted on said shaft and connected to said planet carrier for joint rotation,
      2. said outer faces rotatably engaging said sleeve member,
      2. said sleeve member having an outer bearing face offset axially from said planet gear toward said second bearing member, and
      3. said ring gear having a neck portion rotatably engaging said bearing face;
   g. first and second coupling means drivingly connected to said ring gear and to said sleeve member respectively for joint rotation and engageable with said hub sleeve;
   h. shifting means for selectively actuating one of said coupling means,
      1. said sleeve member having an axial end portion spacedly adjacent said second bearing member;
i. spacer means axially interposed between said end portion and said second bearing member for securing said sleeve member against axial movement toward said second bearing member; and
j. stop means on said sleeve member securing said ring gear against axial movement relative to said sleeve member in a direction toward said second bearing member.

10. A hub as set forth in claim 9, wherein said spacing means include a compression spring surrounding said hub shaft.

11. A hub as set forth in claim 9, wherein said spacing means include a spacing sleeve surrounding said hub shaft.

* * * * *